United States Patent [19]

Noelken et al.

[11] Patent Number: 5,376,703
[45] Date of Patent: Dec. 27, 1994

[54] PROCESS FOR LOWERING THE RESIDUAL MONOMER CONTENT IN AQUEOUS PLASTIC DISPERSIONS BASED ON POLYVINYL ESTERS

[75] Inventors: Ernst Noelken, Bad Soden; Helmut Rinno, Hofheim; Hans-Ullrich Huth, Egelsbach, all of Germany

[73] Assignee: Hoechst AG, Germany

[21] Appl. No.: 38,131

[22] Filed: Mar. 26, 1993

[30] Foreign Application Priority Data

Mar. 28, 1992 [DE] Germany ............... 4210208

[51] Int. Cl.$^5$ ............... C08J 3/00
[52] U.S. Cl. ............... 523/328; 523/340; 524/547; 524/555; 524/556; 524/558; 524/557; 524/559; 524/560; 524/561; 524/562; 524/563; 524/564; 524/832; 524/833
[58] Field of Search ............... 523/340, 328; 524/563, 524/564, 832, 833, 557, 547, 555, 559, 560, 561, 562, 558, 556

[56] References Cited

U.S. PATENT DOCUMENTS

| | | | |
|---|---|---|---|
| 4,032,497 | 6/1977 | Kidoh et al. | 524/563 X |
| 4,168,373 | 9/1979 | Nickerson et al. | 523/340 X |
| 4,195,168 | 3/1980 | Bobbin | 524/563 X |
| 4,217,423 | 8/1980 | McClain | 524/563 X |
| 4,315,843 | 2/1982 | Vidotto et al. | 523/340 X |
| 4,497,941 | 2/1985 | Aliani et al. | 524/563 X |
| 4,542,182 | 9/1985 | Schuppiser et al. | 524/563 |
| 4,575,531 | 3/1986 | Hoyt et al. | 524/563 |
| 4,584,343 | 4/1986 | Löhr et al. | 525/60 |
| 5,200,442 | 4/1993 | Schlipf et al. | 523/340 |

FOREIGN PATENT DOCUMENTS 792548 12/1972 France .

OTHER PUBLICATIONS

Copy of Chem. Abstracts vol. 83, No. 18 Nov. 1975 (1 page).
Copy of Derwent Publication & JP-B-45 003 388 (1 page).
Copy of Search Report (3 pages).

Primary Examiner—Judy M. Reddick
Attorney, Agent, or Firm—Bierman and Muserlian

[57] ABSTRACT

Process for lowering the residual monomer content in aqueous plastic dispersions based on polyvinyl esters.

Preparation of vinyl ester polymers or vinyl ester copolymers containing aqueous plastic dispersions having reduced contents of undesired residual vinyl ester monomers, caused by the preparation, and, optionally, acetaldehyde from corresponding starting dispersions, such as are obtainable from ethylenically unsaturated monomers by conventional polymerization or copolymerization methods, by selective alkaline saponification of the residual vinyl ester monomers saponifiable under alkaline conditions in the dispersions and preferably simultaneous removal of the acetaldehyde and unsaponified residual vinyl ester monomers from the aqueous dispersions by distillation.

Use of the plastic dispersions free from residual monomer as binders in low-emission or emission-free aqueous formulations, for example for paints, coatings, plaster mortars, adhesives, paper sizing agents, nonwoven binders, textile auxiliaries, and the like, in particular for applications in indoor areas or in closed rooms.

12 Claims, No Drawings

PROCESS FOR LOWERING THE RESIDUAL MONOMER CONTENT IN AQUEOUS PLASTIC DISPERSIONS BASED ON POLYVINYL ESTERS

The invention relates to a process for lowering undesired residual monomer contents, caused by the preparation, in aqueous plastic dispersions in which the polymer molecules contain monomer units composed of vinyl esters and contain residual vinyl ester monomers and possibly acetaldehyde, by selective alkaline saponification of the residual vinyl ester monomers which are saponifiable under alkaline conditions in the dispersion and removal of unsaponified residual vinyl ester monomers and the acetaldehyde which may already be present in the initial dispersion and the acetaldehyde additionally formed from the vinyl esters as saponification product from the dispersion by distillation.

Simultaneous removal of unsaponified residual vinyl ester monomers and of acetaldehyde by distillation during the selective saponification of saponifiable residual vinyl ester monomers is preferred. In some cases, it can also be advantageous first selectively to saponify some of the residual vinyl ester monomers and then to complete the removal of residual monomers by further selective alkaline saponification of saponifiable residual vinyl ester monomers which are still present and, at the same time, removal of unsaponified residual vinyl ester monomers which are still present, and of acetaldehyde, by distillation. However, more time-consuming, and therefore less advantageous, variants are also possible, in that either some of the residual vinyl ester monomers are first removed by distillation, together with any acetaldehyde already present, and the removal of residual monomers is then completed by selective alkaline saponification of saponifiable residual vinyl ester monomers which are still present and, at the same time, further removal of unsaponified residual vinyl ester monomers which are still present and of acetaldehyde by distillation, or in that the residual vinyl ester monomers are first selectively saponified and the removal by distillation of the acetaldehyde formed is carried out only at a later time.

Aqueous plastic dispersions which contain polymer plastic particles based on ethylenically unsaturated monomers comprising monomer units composed of vinyl esters have been known for a long time and have many fields of application, for example as binders for paints and coatings, as textile auxiliaries, as an adhesive, as paper sizing agents, as binders for nonwovens and synthetic leather, and the like. The advantages of binder systems and adhesives based on aqueous dispersions are, inter alia, their ease of handling (non-toxicity, non-flammability, easy cleaning of tools, problem-free disposal) and their advantageous ecological properties compared with conventional solvent-containing coating compositions and resins, or their solutions in organic solvents. Organic solvents can be substantially or completely dispensed with in the aqueous plastic dispersions and even polymers which have very high molecular weights can be prepared in the form of aqueous dispersions having a high polymer content and low viscosity and processed without hazard, in contrast to solutions of such polymers in organic solvents, which generally are very highly viscous and consequently can be used only in low concentrations and liberate correspondingly large amounts of solvent during their use.

Aqueous plastic dispersions are therefore becoming increasingly widespread and finding new fields of application. Various types of plastic dispersions based on polyvinyl esters are particularly well known, for example vinyl acetate homopolymer dispersions, for example for adhesives and paints, vinyl acetate/vinyl versatate or vinyl acetate/butyl acrylate or vinyl acetate/2-ethylhexyl acrylate copolymer dispersions, for example for paints, vinyl acetate/ethylene and vinyl acetate/ethylene/vinyl chloride copolymer dispersions, for example as binders for nonwovens, as sizing agents in papermaking and as binders for paints, or vinyl acetate/dibutyl maleate copolymer dispersions. In addition, so-called pure acrylate polymer or copolymer dispersions and styrene/acrylate copolymer dispersions are also known, for example for particularly high quality coatings and for weatherproof outdoor paints, and these dispersions can also be combined with plastic dispersions based on polyvinyl esters in order to modify the properties or, for reasons of cost, can be extended with the latter.

However, one problem with such dispersions which has not yet been satisfactorily solved to date is the residual content of vinyl ester monomers, in particular of vinyl acetate or vinyl propionate, and acetaldehyde, which is formed by hydrolysis of the vinyl ester monomers. Since both vinyl acetate and vinyl propionate and also, in particular, acetaldehyde have, as is known, recently proved to be considerably toxic, the manufacturers of polyvinyl ester dispersions, in particular of polyvinyl acetate and polyvinyl propionate dispersions, are faced with the problem of making commercial products available with residual vinyl ester monomer and acetaldehyde contents which are as low as possible. For the preparation of industrial chemical products, such as, for example, paints based on aqueous polyvinyl ester dispersions, which are emission free and contain aqueous plastic dispersions as binders the aim is to reduce the residual vinyl ester monomer and acetaldehyde contents of the polyvinyl ester dispersions to close to or below the gas-chromatographically detectable detection limit of about 20 ppm, with respect to the aqueous dispersion, and, at the same time, to achieve as low as possible an odor level in the end product.

It is known to carry out monomer removal by completing polymerization of the vinyl ester residual monomers with the aid of free radical-forming initiators or of redox systems, but industrially only residual vinyl ester contents of 0.05 to 0.5% by weight, with respect to the dispersion, can be achieved in this way, whilst the content of acetaldehyde which may already be present is virtually not reduced by this means. There has, therefore, been no lack of attempts to increase the efficiency of, for example, the redox after-treatment, for example by slowing down the cooling of the polymerization mixture in the reactor, which, inter alia, has adverse effects on the space-time yields of the polymerization. A further disadvantage of this after-treatment method is, inter alia, that the redox system, in particular its oxidizing agent component, in some cases can lead to a lowering of the dispersion viscosity, in combination with a lowering of the dispersion stability. Chemical after-treatments of the dispersions, such as, for example, the said addition of redox systems, lead to secondary reactions and also introduce additional substances into the product, which is frequently undesirable, especially if these substances are also toxicologically suspect or—as in the case of, for example, Rongalite, are a product constituent undesired by dispersion processors. In addition, a prolonged after-treatment with initiators and/or redox systems frequently leads to impairment of the odor.

Methods for monomer removal by means of vacuum distillation or steam distillation, such as are disclosed, for example, in DE-OS 2,258,538, are also generally unsatisfactory, although in many cases they can make it possible to lower the residual monomer content to close to the target low ppm range. However, they give rise to considerable energy costs and to the reactors being in use for a longer time and also have the disadvantage that higher-boiling residual monomers, such as, for example, vinyl versatate or octyl acrylate, can be removed only incompletely by these methods. DD-PS 219,026 discloses a process by which vinyl acetate monomer can be converted to ethene/vinyl acetate copolymers by reaction of the polymerization mixture with methanolic sodium methylate to give methyl acetate. However, this process cannot be used on aqueous polyvinyl ester dispersions.

The object on which the present invention is based was, thus, to develop a process which makes it possible to lower the residual monomer concentration of aqueous homopolymer and copolymer dispersions of vinyl esters, in particular of homopolymer and copolymer dispersions of vinyl acetate, to values of $\leq 0.05\%$ by weight, with respect to the dispersion. It was also desirable likewise also to effect an effective lowering in the acetaldehyde content which may frequently be present in vinyl ester polymer or copolymer dispersions, without impairing the characteristic use properties of the dispersion. A further aim of the invention was to produce produces which have as little residual odor as possible.

It has now been possible, surprisingly, to achieve this object by subjecting the dispersions to a subsequent selective saponification treatment at a weakly alkaline pH value and, where appropriate, elevated temperature, in the course of which treatment the residual vinyl ester monomer fractions which are saponifiable under alkaline conditions are split virtually completely by hydrolysis into carboxylic acids and acetaldehyde, whilst the corresponding vinyl ester monomer units in the polymer or copolymer molecules of the polymer dispersion particles surprisingly remain substantially unchanged.

The selective alkaline saponification of the residual vinyl ester monomers which are saponifiable under alkaline conditions is preferably carried out at the same time as the removal, by distillation, of all of the volatile, preferably organic, substances contained in the aqueous dispersion, by distilling of water, preferably under vacuum, from the dispersion, preferably by passing in steam under vacuum or passing through air or inert gas under normal pressure or reduced pressure, preferably, in each case, at the boiling point of water which corresponds to the pressure in the distillation apparatus. By means of the combination, according to the invention, of selective hydrolytic splitting of the hydrolyzable residual vinyl ester monomers with the removal, by distillation, of unsaponified residual vinyl ester monomers together with the acetaldehyde which may already be present in the dispersion and the acetaldehyde formed as reaction product on selective alkaline saponification of the residual vinyl ester monomers, it is possible to achieve a substantial shortening of the total monomer removal process and, at the same time, a high degree of monomer removal from the dispersion, compared with carrying out the combined measures individually, optionally successively. In addition, the combination process according to the invention is characterized by high economy, since the times for which the process equipment is in use can be kept short. Substantially odor-free products can be obtained by the monomer removal process according to the invention.

The acetaldehyde formed on hydrolytic splitting of the vinyl ester, and the acetaldehyde which may already be present, is removed from the system much more rapidly than a vinyl ester monomer when the dispersion is treated by distillation, with co-use of steam or inert gas. The carboxylic acid salt also formed during ester cleavage can, with a surprisingly advantageous effect, remain in the dispersion where it has an advantageous influence on the stability of the dispersion, inter alia as a result of its buffer action.

After the saponification reaction and distillation have been carried out, the contents of residual vinyl ester monomers which are saponifiable under alkaline conditions and of acetaldehyde are each below 0.01% by weight, preferably below 0.002% by weight, with respect to the dispersion, i.e. the residual vinyl ester monomer fractions and the acetaldehyde which are particularly troublesome in the initial dispersion can be virtually completely removed according to the invention.

The substantially monomer-free and acetaldehyde-free polyvinyl ester-containing dispersions obtained in this way also have the further advantage of having a neutral odor. The percentage polymer solid content in the dispersion can increase correspondingly as a result of water losses during the distillation, which in practice is not a disadvantage since the initial dispersion can generally already be adjusted without difficulty to a correspondingly lower initial solids content at the time of its preparation.

A process has also already been proposed (cf. German Offenlegungsschrift 41 10 058) in which the vinyl ester residual monomers remaining in aqueous polyvinyl ester dispersions are likewise saponified under alkaline conditions, but subsequently are not distilled but are further-treated by oxidation.

The object of the invention is, therefore, a process for lowering the residual vinyl ester monomer content and, where appropriate, the acetaldehyde content in aqueous plastic dispersions which contain dispersed polymer particles based on ethylenically unsaturated monomers containing monomer units composed of vinyl esters and have been prepared from the base monomers or comonomers by emulsion, suspension, bead, solution or bulk polymerization, wherein, in order to remove residual vinyl ester monomer and, where appropriate, acetaldehyde contents, the vinyl ester monomers which are saponifiable under alkaline conditions are split hydrolytically into the corresponding carboxylates and acetaldehyde by a selective saponification treatment of the dispersions at a weakly alkaline pH value and preferably at elevated temperature, and the acetaldehyde or, preferably simultaneously, unsaponified residual vinyl ester monomers and acetaldehyde is or are distilled off.

The process according to the invention can preferably be used for the removal of residual vinyl acetate and vinyl propionate monomer, in particular vinyl acetate monomer, and of acetaldehyde formed by saponification and acetaldehyde which may already be present, from aqueous plastic dispersions.

The preparation of the aqueous starting polyvinyl ester dispersions can be carried out in a known manner from the corresponding monomers by free radical polymerization, preferably by emulsion, suspension or bead polymerization. In some cases it can also be achieved from solution polymers or from solutions of bulk polymers in accordance with known methods via the aqueous emulsions thereof.

Starting plastic dispersions which are preferably used are those in which the polymer particles contain homopolymers or copolymers of vinyl acetate or vinyl propionate, in particular of vinyl acetate, or are composed of copolymers of vinyl acetate, preferably with ethylene.

Further starting plastic dispersions which are preferably used are those in which the polymer particles contain copolymers of vinyl acetate and one or more monomer units from the group comprising vinyl esters of ($C_3$–$C_{18}$)-carboxylic acids, acrylates, methacrylates, maleic acid, fumaric acid or itaconic acid half-esters or diesters of ($C_1$–$C_{22}$)-alcohols or of ($C_2$–$C_{22}$)-hydroxy alcohols, amides or mono- or di-($C_1$–$C_{12}$)alkylamides or -($C_2$–$C_{12}$)alkylolamides of ethylenically unsaturated ($C_3$–$C_5$)-monocarboxylic or -dicarboxylic acids, ethylene, isobutylene, vinyl chloride, vinylidene chloride, vinyl($C_1$–$C_4$)-alkyl ethers, acrylonitrile, acrylic acid, methacrylic acid, acrylamido-2-methylpropanesulfonic acid, vinylphosphonic acid or vinylsulfonic acid.

Copolymers containing comonomer units composed of N-methylolacrylamide, N-alkoxymethylacrylamide, 2-hydroxyethyl acrylate and 2-hydroxypropyl acrylate and of the corresponding methacrylate compounds are important, for example, for the adhesives or textile sector.

In order to obtain a specific degree of crosslinking, the copolymers can contain monomer units composed of divinyl adipate, diallyl maleate, trimethylolpropane triacrylate, allyl methacrylate, N-methylolacrylamide, triallylcyanurate, dicylcopentadienyl acrylate or methylene-bis-acrylamide. The starting plastic dispersions used according to the invention optionally contain further conventional additives, such as, for example, ionic and/or nonionic emulsifiers and protective colloids.

Prior to use in the process according to the invention, the residual monomer content (RMC) of the starting plastic dispersions can already be lowered by chemical pretreatment, preferably by complete polymerization by means of free-radical forming agents or redox catalysts.

The saponification treatment of the dispersion at a weakly alkaline pH value is preferably carried out in the pH range from 7.1 to 10, in particular from 7.5 to 9, and preferably in the temperature range from 20° to 100° C., in particular 40° to 80° C. and particularly preferentially 50° to 70° C.

In order to carry out the saponification reaction, inorganic or organic basic compounds are added, preferably in 0.5 times to twice the stoichiometric amount, in particular in once the stoichiometric amount, with respect to the free acids which may already be present in the dispersion for neutralization plus the acids formed from the vinyl esters by the saponification reaction, to the aqueous plastic dispersion at the chosen, preferably elevated, temperature, so that a neutral to weakly alkaline pH value results in the dispersion. The addition of basic compounds is preferably carried out stepwise with pH control, preferably with simultaneous removal, by distillation, of unsaponified residual vinyl ester monomers together with acetaldehyde. A further preferred process variant comprises first saponifying approximately half to three quarters of the saponifiable residual vinyl ester monomers present under pH control and only then starting the removal, by distillation, of unsaponified residual vinyl ester monomers and the acetaldehyde, at the same time continuing the pH-controlled selective saponification of residual vinyl ester monomers until all of the monomers have been removed from the dispersion. Control of the pH value of the dispersion is preferably carried out continuously by means of a glass electrode, in order to ensure precise adjustment and maintenance of the pH value. This prevents the optimum pH value range for the target selective saponification of the residual vinyl ester monomers from being exceeded during the saponification reaction and after its completion. This is very important in order to prevent undesired saponification of ester groups in the vinyl ester polymer or copolymer.

The end point of the saponification of the residual vinyl ester monomers can be established, for example, by determining the amount of alkali metal hydroxide required for saponification in a preliminary experiment or by continuously monitoring the vinyl ester content in the dispersion gas chromatographically during the saponification process.

The basic compounds are preferably added in the form of dilute aqueous base solutions, in particular having base concentrations of from 0.5 to 50% by weight, particularly preferentially 1 to 10% by weight, in order to facilitate precise dosage during adjustment of the pH value.

The saponification treatment of the dispersion can be carried out discontinuously, for example in a heatable stirred apparatus, or continuously, for example in a heatable tube reactor to which a distillation apparatus is connected, in which case temperatures of up to 100° C., preferably of 85° to 100° C., and dwell times of from 1 to 5 minutes in the tube reactor can be advantageous. The rate of saponification increases with increasing reaction temperature under comparable conditions. In general, the saponification can take preferably between 1 minute and 7 hours, in particular 6 minutes to 4 hours. The starting polymer dispersions which are frequently obtained warm immediately after their preparation are preferably fed immediately to the saponification treatment according to the invention.

The following compounds and in particular the aqueous solutions or aqueous dilutions thereof are preferably used as basic compounds for the purposes of the invention:
  alkali metal oxides, alkali metal hydroxides, alkali metal carbonates, alkali metal hydrogen carbonates, alkaline earth metal oxides, alkaline earth metal hydroxides, alkaline earth metal carbonates, ammonia, alkanolamines and quaternary alkylammonium or alkylarylammonium hydroxides, alkali metal compounds, in particular sodium hydroxide and potassium hydroxide, being particularly preferred.

The removal, by distillation, of the acetaldehyde formed and also of any acetaldehyde already present can be carried out during the alkaline saponification reaction or thereafter. The distillation can also be carried out under elevated pressure, but is preferably carried out under normal pressure or, in particular, under reduced pressure.

In order to accelerate the distillation, steam or a carrier gas, such as, for example, air, nitrogen, argon or carbon dioxide, can be passed over the surface of the plastic dispersion. Advantageously, however, the carrier gas is passed in the distillation apparatus from the bottom through the plastic dispersion. When a carrier gas such as air, nitrogen or argon is used in the monomer removal, coolants having a lower temperature than water, for example coolant sols or acetone/solid carbon dioxide, are optionally used in the condenser.

Under certain circumstances, troublesome foaming can arise during monomer removal and distillation. This can be prevented by the use of small amounts, preferably 0.001 to 0.5% by weight, with respect to the dispersion, of antifoams based on natural fats and oils, such as, for example, sperm oil and train oils, paraffin oil, long-chain alcohols, such as cetyl alcohol, high-polymer fatty acid polyglycol esters, sorbitan monolaurate and silicones. Low-emission and odor-free antifoams are preferably used.

According to the invention, the contents of residual vinyl ester monomers saponifiable under alkaline conditions, preferably of vinyl acetate, and of acetaldehyde in the aqueous plastic dispersion after the end of the removal measures according to the invention are each below 0.01% by weight, preferably ≦0.002% by weight, in each case with respect to the dispersion, the latter value representing the current lower detection limit of the gas-chromatographic analytical method used.

The aqueous plastic dispersions based on polymers containing vinyl ester monomer units freed from residual monomer contents and acetaldehyde according to the invention and obtained in low-emission or emission-free form are suitable preferably as binders in low-emission or emission-free aqueous formulations for paints, coatings, plaster mortars, decorative mortars, adhesives, paper sizing agents, nonwoven binders, textile auxiliaries, foodstuff coating agents, paints and industrial chemical formulations, in particular for applications in indoor areas or in closed rooms. They optionally contain further conventional additives, such as, for example, preservatives.

The invention is illustrated in more detail by the following examples.

EXAMPLE 1

5500 g of an aqueous 56.7% strength by weight vinyl acetate/ethylene copolymer dispersion containing 18% by weight of ethylene in the copolymer and having a pH value of 4.3 are stirred with 0.73 g of antifoam, which is dispersed in 12.2 g of water, in a 10 l 4-necked flask provided with a stirrer, a heating bath, an internal thermometer and a pH electrode and gas inlet tube dipping into the dispersion, and the vinyl acetate content and acetaldehyde content of the dispersion are then determined by gas chromatography (sample a). The dispersion is heated to an internal temperature of 60° C. and its pH value is adjusted to 9 by adding 200 ml of 3.2% strength by weight sodium hydroxide solution (sample b). Air is passed through the dispersion for 8 hours under a vacuum of 200–400 mbar and during the first 6 hours the pH value of 9 is kept constant by dropwise addition of 3.2% strength by weight sodium hydroxide solution. During the 7th and 8th hours, the pH value is adjusted to 8.0, after discontinuing the addition of alkali for a short time. In total 120 ml of 3.2% strength by weight sodium hydroxide solution are consumed during the time when air is passed through. Samples c to i are drawn off after 0.5, 1, 2, 3, 4, 6 and 8 hours. The solids content of the dispersion has risen to 60.15% by weight after 4 hours distillation After cooling to 30° C., the dispersion is diluted to a solids content (SC) of 55% by weight by adding water. The pH value of the dispersion free from residual monomers is 7.8 (sample k). The residual monomer values determined by gas chromatography for samples a to k, in percent by weight with respect to the dispersion, are summarized in Table 1.

EXAMPLE 2

The procedure is as in Example 1, except that nitrogen is passed through the dispersion instead of air. The solids content rises to 60% by weight on stirring, heating and distillation whilst passing nitrogen through. After cooling to 30° C. and diluting the dispersion free from residual monomers to a solids content of 55% by weight, the pH value of the dispersion is 8.0. The residual monomer values of samples a to k are summarized in Table 1.

Comparison Example 1

The procedure is as in Example 1, except that 384 ml of water are added instead of the 320 ml of 3.2% strength by weight sodium hydroxide solution. The solids content rises to 58% by weight on distillation whilst stirring, heating and passing through air under vacuum. After cooling the dispersion and diluting to a solids content of 55% by weight, the pH value of the dispersion is 4.35. The analytical values of samples a to k are summarized in Table 1.

TABLE 1

Residual monomer contents from Example 1 and 2 and Comparison Example 1, determined by gas chromatography Residual monomer contents in the dispersion in % by weight, with respect to the dispersion

| Sample | Time of sampling during monomer removal | Example 1 Vinyl acetate (% by weight) | Example 1 Acetaldehyde (% by weight) | Example 2 Vinyl acetate (% by weight) | Example 2 Acetaldehyde (% by weight) | Comparison example 1 Vinyl acetate (% by weight) | Comparison example 1 Acetaldehyde (% by weight) |
| --- | --- | --- | --- | --- | --- | --- | --- |
| a | Prior to distillation | 0.203 | 0.027 | 0.209 | 0.031 | 0.280 | 0.028 |
| b | Immediately after heating to 60° C. at pH 9 | 0.164 | 0.040 | 0.116 | 0.037 | 0.260 | 0.021 |
| c | After 1/2 an hour | 0.080 | 0.025 | 0.060 | 0.025 | 0.160 | 0.009 |
| d | After 1 hour | 0.033 | 0.010 | 0.024 | 0.014 | 0.088 | 0.003 |
| e | After 2 hours | <0.016 | <0.006 | 0.006 | <0.003 | 0.038 | 0.002 |
| f | Ater 3 hours | <0.002 | <0.002 | 0.002 | <0.002 | 0.013 | 0.002 |
| g | After 4 hours | <0.002 | <0.002 | <0.002 | <0.002 | 0.007 | 0.002 |
| h | Alter 6 hours | <0.002 | <0.002 | <0.002 | <0.002 | 0.005 | 0.002 |
| i | After 8 hours | <0.002 | <0.002 | <0.002 | <0.002 | <0.002 | <0.002 |
| k | After diluting | <0/002 | <0.002 | <0.002 | <0.002 | <0.002 | <0.002 |

TABLE 1-continued

Residual monomer contents from Example 1 and 2 and Comparison Example 1, determined by gas chromatography

| | | Residual monomer contents in the dispersion in % by weight, with respect to the dispersion | | | | | |
|---|---|---|---|---|---|---|---|
| | | Example 1 | | Example 2 | | Comparison example 1 | |
| Sample | Time of sampling during monomer removal | Vinyl acetate (% by weight) | Acetaldehyde (% by weight) | Vinyl acetate (% by weight) | Acetaldehyde (% by weight) | Vinyl acetate (% by weight) | Acetaldehyde (% by weight) |
| | to a SC of 55% by weight | | | | | | |

EXAMPLE 3

5500 g of a 55.9% strength by weight polyvinyl acetate dispersion having a pH value of 4.5 and a residual vinyl acetate content of 0.1% by weight, with respect to the dispersion, are stirred with 0.73 g of the antifoam of Example 1 in 12.2 g of water and with 1375 g of water and heated to 60° C. in a 10 l 4-necked flask provided with a stirrer, a heating bath and an internal thermometer. The pH value is adjusted to 8.5 by adding 200 ml of 3.2% strength by weight sodium hydroxide solution. The distillation is carried out under a reduced pressure of 200–300 mbar. After 3 hours 1375 ml of distillate had passed over. The solids content (SC) of the dispersion is then 57.75% by weight. After cooling to 30° C., the SC is adjusted to 55% by weight by adding water. The pH value of the dispersion from which the monomer has been removed is 7.0. No further vinyl acetate and no further acetaldehyde are detectable in the dispersion by gas chromatography. The dispersion is odor-free.

Comparison Example 2

The procedure is as in Example 3, except that no sodium hydroxide solution is added. A 56.3% strength by weight dispersion is obtained after the distillation. After cooling to 30° C., the dispersion is adjusted to a solids content of 55% by weight with water. Its pH value is 4.6 and the residual vinyl acetate content is 0.017% by weight, with respect to the dispersion. The dispersion has a somewhat sharp, pungent odor.

We claim:

1. A process for lowering the content of residual vinyl ester monomer(s) and optionally of acetaldehyde in aqueous plastic dispersions which contain dispersed polymer particles based on ethylenically unsaturated monomers which contain monomer units of vinyl ester(s) and have been prepared from the base monomer(s) or comonomer(s) therewith by emulsion, suspension bead, solution or bulk polymerization, wherein to remove residual contents of vinyl ester monomer(s) and optionally acetaldehyde, the vinyl ester monomer(s) are split hydrolytically into the corresponding carboxylates and acetaldehyde by a selective saponification treatment of the dispersions at a weakly alkaline pH value and optionally at elevated temperature and then the acetaldehyde or unsaponified residual vinyl ester monomer(s) and optionally acetaldehyde is or are distilled off.

2. The process as claimed in claim 1, wherein the polymer particles contain monomer units selected from the group consisting of vinyl acetate and vinyl propionate and optionally also contain monomer units of vinyl versatate.

3. The process as claimed in claim 1, wherein the polymer particles are homopolymers or copolymers of vinyl acetate.

4. The process as claimed in claim 1, wherein the polymer particles contain copolymers of vinyl acetate and one or more monomer units selected from the group consisting of vinyl esters of ($C_3$–$C_{18}$)-carboxylic acids, acrylates, methacrylates, maleic acid half-esters or diesters of ($C_1$–$C_{22}$)-alcohols or of ($C_2$–$C_{22}$)-hydroxy alcohols fumaric acid half-esters or diesters of ($C_1$–$C_{22}$)-alcohols or of ($C_2$–$C_{22}$)-hydroxy alcohols, itaconic acid half-esters or diesters of ($C_1$–$C_{22}$) alcohols or of ($C_2$–$C_{22}$)-hydroxy alcohols, amides of ethylenically unsaturated ($C_3$–$C_5$)-mono- or dicarboxylic acids, mono- or di-($C_1$–$C_{12}$) alkyl-amides of ethylenically unsaturated ($C_3$–$C_5$)-mono- or dicarboxylic acids, ($C_2$–$C_{12}$) alkylolamides of ethylenically unsaturated ($C_3$–$C_5$)-mono- or dicarboxylic acids, ethylene, isobutylene, vinyl chloride, vinylidene chloride, vinyl($C_1$–$C_4$)-alkyl ethers, acrylonitrile, acrylic acid, methacrylic acid, acrylamido-2-methylpropanesulfonic acid, vinylphosphonic acid and vinylsulfonic acid.

5. The process as claimed in claim 1, wherein the saponification treatment is carried out in the pH range from 7.1 to 10, at temperatures in the range from 20° to 100° C., and the distillation of the acetaldehyde is carried out during the saponification reaction or thereafter.

6. The process as claimed in claim 1, wherein the process is carried out discontinuously or continuously, the continuous process being carried out in a tube reactor to which a distillation apparatus is connected.

7. The process as claimed in claim 1, wherein the saponification treatment is carried out with the addition of inorganic or organic basic compounds in the form of aqueous solutions of said basic compounds, and using 0.5 times to twice the stoichiometric amounts of said basic compounds, with respect to the stoichiometric total amount of acid constituents already present in the dispersion plus the acids formed by the residual monomer saponification.

8. The process as claimed in claim 1, wherein the saponification treatment is carried out with the addition of basic compounds selected from the group consisting of alkali metal oxides, alkali metal hydroxides, alkali metal carbonates, alkali metal hydrogen carbonates, alkaline earth metal oxides, alkaline earth metal hydroxides, ammonia, alkanolamines quaternary alkylammonium hydroxides, alkylarylammonium hydroxides and aqueous solutions of said compounds.

9. The process as claimed in claim 1, wherein the required amount of base is added successively or all at once or, optionally, initially ⅔ of the amount is added all at once and the remaining third is then added successively with pH control.

10. The process as claimed in claim 1, wherein the distillation of the acetaldehyde and unsaponified residual vinyl ester monomer(s) is carried out under normal pressure or under reduced pressure and optionally accelerated by blowing steam or a carrier gas into the reactor or into the distillation apparatus of the tube reactor.

11. The process as claimed in claim 1, wherein the contents of residual vinyl ester monomers saponifiable under alkaline conditions and of acetaldehyde in the aqueous plastic dispersion after the end of the reactions for removal by hydrolysis and distillation are each below 0.01% by weight with respect to the dispersion.

12. A low emission or emission free aqueous paint formulation containing, as a binder, the aqueous plastic dispersions produced by the process of claim 1 free of residual monomers.

* * * * *